US008624505B2

(12) United States Patent
Huang

(10) Patent No.: US 8,624,505 B2
(45) Date of Patent: Jan. 7, 2014

(54) LIGHT COLOR AND INTENSITY ADJUSTABLE LED

(75) Inventor: Hsin-Chieh Huang, Hsinchu City (TW)

(73) Assignee: TSMC Solid State Lighting Ltd., Hsin-Chu (TW)

( * ) Notice: Subject to any disclaimer, the term of this patent is extended or adjusted under 35 U.S.C. 154(b) by 398 days.

(21) Appl. No.: 12/789,763

(22) Filed: May 28, 2010

(65) Prior Publication Data

US 2011/0291564 A1 Dec. 1, 2011

(51) Int. Cl.
*H05B 37/02* (2006.01)
*B60Q 1/14* (2006.01)

(52) U.S. Cl.
USPC ............. 315/152; 315/77; 315/118; 315/149; 315/185 R; 315/291

(58) Field of Classification Search
USPC ........ 315/77, 118, 149–159, 185 R, 291, 309
See application file for complete search history.

(56) References Cited

U.S. PATENT DOCUMENTS 6,069,676 A * 5/2000 Yuyama .......................... 349/62
6,411,046 B1 * 6/2002 Muthu .......................... 315/309
6,448,550 B1 9/2002 Nishimura
7,064,498 B2 * 6/2006 Dowling et al. .............. 315/291
7,108,413 B2 9/2006 Kwong et al.
7,157,694 B2 * 1/2007 May et al. ...................... 250/228
7,230,222 B2 6/2007 Cheng et al.
7,432,659 B2 10/2008 Park et al.
7,518,319 B2 4/2009 Konno et al.
7,560,677 B2 * 7/2009 Lyons et al. .................. 250/205
2006/0238368 A1 * 10/2006 Pederson et al. ......... 340/815.45
2007/0211463 A1 * 9/2007 Chevalier et al. ............. 362/249
2008/0297066 A1 * 12/2008 Meijer et al. .................. 315/291
2010/0060440 A1 * 3/2010 Suzuki .......................... 340/435
2010/0288637 A1 * 11/2010 Wei et al. ...................... 204/431

FOREIGN PATENT DOCUMENTS

JP 10049074 2/1998
JP 2005310997 A 11/2005

OTHER PUBLICATIONS

Korean Patent Office, Office Action dated Aug. 22, 2012, 9-5-2012-048946549, Notice of Preliminary Rejection, 11 pages including English translation.

* cited by examiner

*Primary Examiner* — Douglas W Owens
*Assistant Examiner* — Thai Pham
(74) *Attorney, Agent, or Firm* — Haynes and Boone, LLP

(57) ABSTRACT

An integrated photonic device includes a number of LEDs and a feedback mechanism that measures individual LED light outputs using a photo sensor via a light transmitter disposed in the vicinity of individual LEDs. A controller or driver adjusts a current driven to each LED using the detected values according to various logic based on the device application.

20 Claims, 5 Drawing Sheets

LIGHT COLOR AND INTENSITY ADJUSTABLE LED

TECHNICAL FIELD

The present disclosure relates generally to a semiconductor device, and more particularly, to an integrated photonic device.

BACKGROUND

A Light-Emitting Diode (LED), as used herein, is a semiconductor light source including a semiconductor diode and optionally photoluminescence material, also referred to herein as phosphor, for generating a light at a specified wavelength or a range of wavelengths. LEDs are traditionally used for indicator lamps, and are increasingly used for displays. An LED emits light when a voltage is applied across a p-n junction formed by oppositely doping semiconductor compound layers. Different wavelengths of light can be generated using different materials by varying the bandgaps of the semiconductor layers and by fabricating an active layer within the p-n junction. Additionally, the optional phosphor material changes the properties of light generated by the LED.

In LED displays, multiple LEDs are often used to form a color image pixel. In one example, three separate light sources for red, green, and blue in separate LEDs having different compositions, individual optics and control are grouped or driven together to form one pixel. The pixel can generate a full spectrum of colors when individual LEDs are activated and controlled. As this display ages, the white point of the display can move as the different color LEDs age at different rates.

An LED can also be used to generate white light. A white light LED usually generates a polychromatic light through the application of one or more phosphors. The phosphors Stokes shift blue light or other shorter wavelength light to a longer wavelength. The perception of white may be evoked by generating mixtures of wavelengths that stimulate all three types of color sensitive cone cells (red, green, and blue) in the human eye in nearly equal amounts and with high brightness compared to the surroundings in a process called additive mixing. The white light LED may be used as lighting, such as back lighting for various display devices, commonly in conjunction with a liquid crystal display (LCD). There are several challenges with LED backlights. Good uniformity is hard to achieve in manufacturing and as the LEDs age, with each LED possibly aging at a different rate. Thus it is common to see color temperature or brightness changes in one area of the screen as the display age with color temperature changes of several hundreds of Kelvins being recorded.

Other uses of LED light include external vehicular lighting or outdoor lighting such as street lamps and traffic lights. LED lights can last longer and uses less electricity than traditional bulbs and thus their use are becoming more widespread. Many of these uses involve safety applications, such as turn signals, headlights, and traffic lights.

Integrated photonic devices incorporate one or many LEDs in an assembly provided for use as standalone or as part of a consumer product. Integrated photonic devices often include a driver and other components are designed for various lighting and imaging applications. Design of integrated photonic devices aims to maximize the useful life of the entire device, include desirable features, and lower costs.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
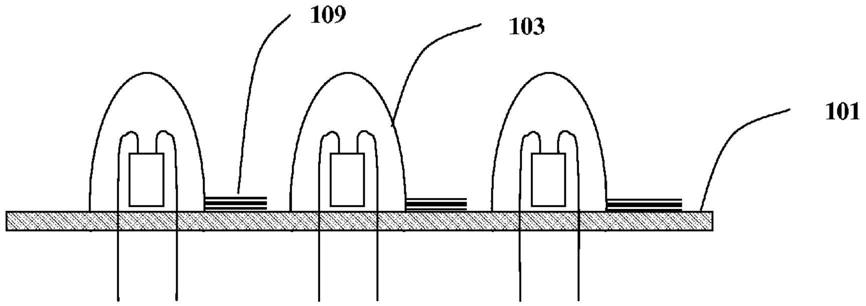
FIGS. 1A and 1B illustrate various views of an integrated photonic device according to various aspects of the present disclosure.

It is understood that the following disclosure provides many different embodiments, or examples, for implementing different features of various embodiments. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1B:
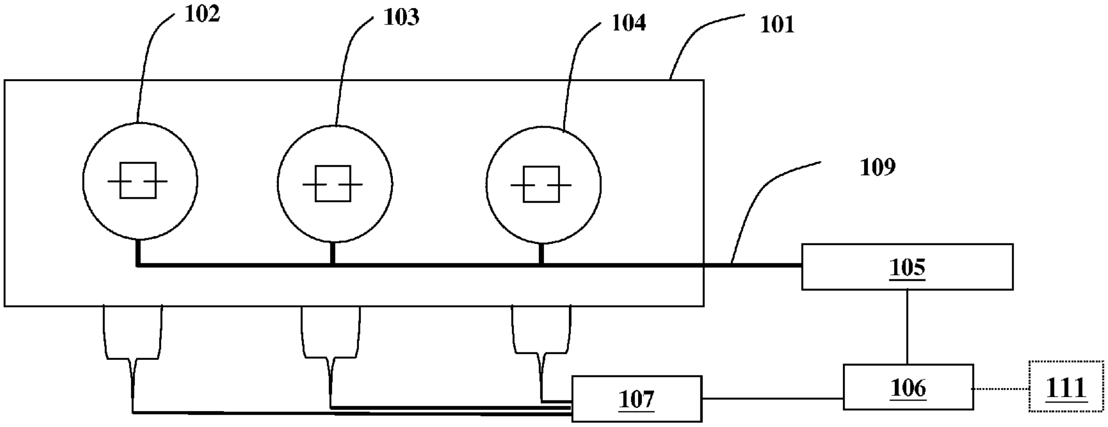

Illustrated in FIGS. 1A and 1B are different views of an integrated photonic device in accordance with various embodiments of the present disclosure. FIG. 1A shows a side view, and FIG. 1B shows a top view of LEDs 102, 103, and 104 on a device substrate 101. The LEDs may have many configurations and material compositions. The LEDs 102, 103, 104 may have the same configuration and material composition or different ones.

In certain embodiments in accordance with the present disclosure, an optical transmission line 109, or a light transmitter, is disposed proximate to each LED. The light transmitter 109 transmits light generated by the LEDs from the location proximate to the LED to a light detector 105. The light transmitter 109 may be an optic fiber, a light pipe, a covered trench in a substrate, or other available light transmitter. As shown, the light transmitter 109 is disposed next to a lens covering each LED at a horizontal level. In certain embodiments, the light transmitter 109 is located at approximately the same location for each LED so that the detected values are at least initially the same. However, the light transmitter 109 need not be located outside of the lens or be in contact of the lens as shown. For example, the light transmitter 109 may be disposed inside of the lens closer to the LED die. In other instances, the light transmitter 109 may be inserted into the lens material at an angle so as to capture more of the light generated. Generally, care is taken to place the light transmitter so that only the light generated at the particular LED is transmitted, i.e., without capturing interfering light from other LEDs or reflected light.

In certain cases, a different light transmitter 109 may be provided at each LED and multiplexed to the light detector 105. In other cases, the light transmitter 109 may be an optic fiber cable branched to each LED with available techniques so that the light transmitted is additive at the detector.

The light detector 105 includes a photo sensor disposed to receive light through the light transmitter. The photo sensor may be a charge-coupled device or a Complementary metal-oxide-semiconductor (CMOS) sensor. The photo sensor may also be a simple photovoltaic cell such as a solar cell or another LED.

A controller 106 is connected to the light detector 105 and converts the signal corresponding to a light property detected to a control signal, which is sent to a driver 107. The controller 106 may be very simple. In some embodiments, the controller 106 may compare two values and instruct the driver to increase the current if one value is sufficiently different from the another. One of those values is the detected light, and the other value may be a specified value, a user inputted value, or another detected value. In some embodiments, the controller 106 may receive a signal from a user input device 111. The user input device 111 may be a dimmer, the signal may be the user inputted value that is compared against the detected value.

The controller 106 may be more complex. In certain embodiments, the controller includes a logic processor and memory. The processor may perform an algorithm using the detected value, memory value, and user inputted value and output the result to the driver 107.

The driver 107 is connected to individual LEDs and drives a current to each LED that causes the LED to generate light. An LED generates light when a current is driven across a p-n junction in the semiconductor diode of the LED. The intensity of the light generated by the LED is correlated to the amount of current driven through the diode and the voltage across the diode. Each LED may be rated for certain luminosity and power based on its size and composition. In some embodiments, within a certain current range, the intensity of light generated by the LED is roughly linear. Above a certain current, the LED is saturated and the light intensity does not increase further. At current levels below the saturation current, an increase in current driven causes the light intensity to increase. However, the correlation between current and intensity varies over time as the LED decays. As the LED is subjected to repeated use, more and more current is required to generate the same light intensity. Further, the current adjustment required to change the light intensity from 50% of rating to 100% of rating may also increase over time. If the LED degrades to the point that the amount of current required to achieve 100% light intensity exceeds the saturation current, then the 100% light intensity would be unattainable regardless of current driven through the LED.

The LED decay process can last much longer than that of other light sources. When an incandescent bulb starts to decay, comparatively little more use would cause the bulb to break, most likely at the filament and to cause an open circuit. If more current is driven through the incandescent bulb, the decay would be accelerated. While an increase in current also causes a LED to decay faster, a LED can pass current far longer even while as it decays.

LEDs having the same composition may decay differently. Usually, LEDs in the same device are binned to have very similar initial properties, such as intensity and spectral distribution. Even LEDs with similar initial properties, however, do not necessarily decay at the same rate. Over the life time of the device, each of the LEDs in the same device generates light having different properties. One LED may reduce in light intensity faster than others when the same current is driven through it. Another LED may drift in spectral distribution and perceived color difference is generated.

Referring back to FIG. 1B, the driver 107 is shown connected to each LED and drives a current through each LED based on the output of the detector 105. The detector 105 sends a signal to driver 107 corresponding to a property of the light detected. This feedback mechanism is shown in FIG. 2.

Figure 2:
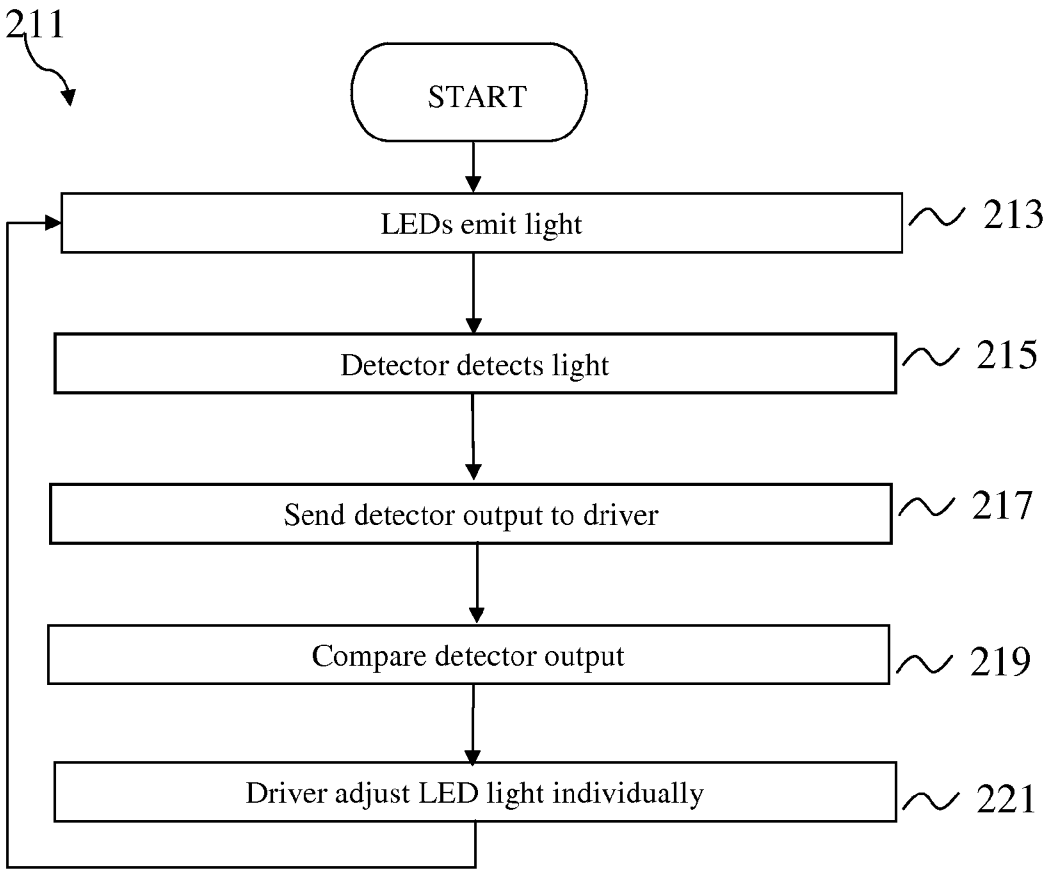
FIG. 2 is a flowchart illustrating a method of using an integrated photonic device according to certain embodiments of the present disclosure.

Referring to FIG. 2, the method 211 shows one particular embodiment of how the feedback loop of FIGS. 1A and 1B may be used. In operation 213, LEDs emit light. An integrated photonic device includes many LEDs, all of which may emit light. Light at the LEDs is detected in operation 215 via the light transmitter at the detector. The detection is converted to various light properties, such as intensity, color, color temperature, or spectral distribution. For example, a light color can be determined by using charge-coupled device or a Complementary metal-oxide-semiconductor (CMOS) sensor where the light may be first filtered through multiple color filters and the light intensity corresponding to different light wavelengths is separately measured. A controller having a processor can convert the separately detected values to a color. The same principle can be used to determine a color temperature or spectral distribution by measuring the light intensity at various wavelengths and integrating the results. In one example, several photo diodes are stacked such the light passes through the stack successively and each photo diode measures a different wavelength.

In the embodiment shown in FIG. 1A, the light transmitter is located at each LED. The light from each LED may be detected separately by turning on the LED one by one, or in sum when all of the LEDs are turned on. Each LED may be connected to the detector via a separate transmitter. Each LED may also be connected to the detector via the same transmitter for all LEDs by having branches of the light transmitter located at each LED. In still other embodiments, one unbranched light transmitter may collect the light generated by several LEDs. For example, a light output for a group of four LEDs may be detected. In these embodiments, the group of LEDs may be controlled together.

In operation 217, the detector output is fed back to the driver or a controller where the detector output is compared in operation 219. In FIG. 1B, a signal cable connects the detector and the driver/controller; however, the detector and driver/controller need not be separate assemblies and may be a part of the same component.

The detector output may be compared with an expected value stored in the driver/controller, a historic value, i.e. an initial value or a value from the previous detection, or a neighboring LED light output value. Different comparison modes are suitable for different types of apparatus operation. For example, when uniformly high light intensity for the device is important, the LED light output is compared to its neighbor. If a LED light intensity is lower than its neighbor, its current may be increased in operation 221, where the driver adjusts LED light individually. The increase in current would be set to have the LED light output increase to that of its neighbor so as to maintain a uniformly high intensity output.

On the other hand, if only uniform light intensity is required, the lower light intensity LED current may not be changed, because increasing its current may accelerate decay. In this case the current to the higher intensity LED may be reduced to match the output of the lower intensity LED. The total output for the entire device would reduce, but device useful life may be prolonged by maintaining uniform intensity, albeit at a lower total value.

In still other instances, the driver may change the current so as to maintain a specified total light output. This may be important in a safety or calibration situation. The feedback loop would then be used to maintain an initial light intensity or a specified light intensity from a controller.

The methods of FIG. 2 may be performed continuously through out the operation of the integrated photonic device or be initiated in a discrete way. For example, the methods may be performed at device turn-on. Once the LEDs are adjusted when the device turns on, the settings may remain the same until the next time the device turns on. The methods may also be performed for calibration only, such as in response to a calibration button being pressed. The method may repeat from operation 213 until the comparison in operation 219 results in no need to adjust LEDs. Because the light detection and comparison can be performed quickly, it is possible to implement this feedback loop with simple logic that merely increases or decreases the driver output incrementally until a desired light output is detected.

An integrated photonic device may have user configurable controls that allow various settings to be set, for example, a dimmer. A user selects a setting depending on a desired intensity level. While a conventional driver/controller would output a current based on the setting as proportion of a maximum current, a driver/controller in accordance with various embodiments of the present disclosure would output a current that best matches the desired intensity level using the intensity feedback mechanism as described. Thus a setting of 50% intensity would not decrease in intensity over time as would when a conventional driver/controller is used.

An example integrated photonic device having a dimmer is a LED light fixture. The light fixture includes a plurality of light emitting diodes (LEDs), an optical transmission line, a light detector, a driver, a dimmer, and a controller. The light detector includes a photo sensor disposed to receive light through the optical transmission line. The driver is coupled to the LEDs and the light detector and includes a current generator. The dimmer switch includes one or more dimmed positions. The controller is coupled to the driver and the light detector and configured to adjust the current generated such that a total light detected equals to a specified value corresponding to a dimmed position when the dimmer switch is set on the dimmed position.

Another example integrated photonic device having a dimmer may be a backlight for a display. The device may include a light detector that detects the ambient light in addition to light generated by the LEDs in the device. The controller in such a device would be able to adjust the amount of backlight based on ambient light, for example, dimming the backlight for nighttime viewing.

The integrated photonic device may include some memory that allows the controller to compare the detected value with a historical value, which may be an initial value. The ability to save an initial value in the memory is useful because the detected light values may not be the same for the same LED output due to light transmitter location and installation variability. In other words, the detected light values for each LED may be calibrated or normalized from the initial value. If LEDs with similar initial values are binned before they are grouped into the same device, the initial value corresponds to an initial light intensity. In other embodiments, the LEDs may be tested so that the initial value is a calibration point.

Another aspect of the use of memory involves relaxing of binning limitations, which reduces manufacturing costs. LEDs are binned into groups having similar initial output properties before they are installed into a device. For many devices the groups are defined very narrowly, causing many LEDs to be rejected into a lower bin that can only be used in devices having a lower economic value. The rationale behind the narrow bin groups has to do with uniformity, both initial and over time. Because the detection and control mechanisms according various embodiments of the present disclosure can ensure uniform light output over time, the binning requirements can be relaxed, thereby reducing rejects.

Although FIGS. 1A and 1B show a device having three LEDs, the integrated photonic device of the present disclosure is not limited to 3-LED devices. In fact any number of LEDs may be included in the device. In a light bar device, the number of LEDs may be more than 3, more than 10, or more than 20.

According to various embodiments of the present disclosure, the LEDs in the device may be different from each other. LEDs 102, 103, and 104 of FIG. 1B may generate lights having different properties, for example, different light colors. For example, the integrated photonic device may be an RGB device in which LED 102 may generate a red color light; LED 103 may generate a green color light; and LED 104 may generate a blue color light. As being used in some lighting applications, such a combination of red/green/blue LEDs is used in a device to generate white light. The device output has an adjustable color temperature. Further, as an image pixel, the LEDs may be separately controlled to generate any color together. LEDs 102, 103, and 104 may be manufactured using different color phosphors coated on semiconductor diodes of the same composition. LEDs 102, 103, and 104 may also generate different color light by having semiconductor diodes of different compositions and structure.

The detector 105 in a RGB device may detect the light color, intensity, and other spectral information of each LED in sequence, for example, by using separate light transmitters for each LED, or by turning on the LEDs sequentially when one light transmitter with many branches is used. The information is used to adjust the current output to change the generated light properties, for example, changing intensity, color, or color temperature. In one embodiment, the controller maintains the device output color temperature and intensity.

Figure 3:
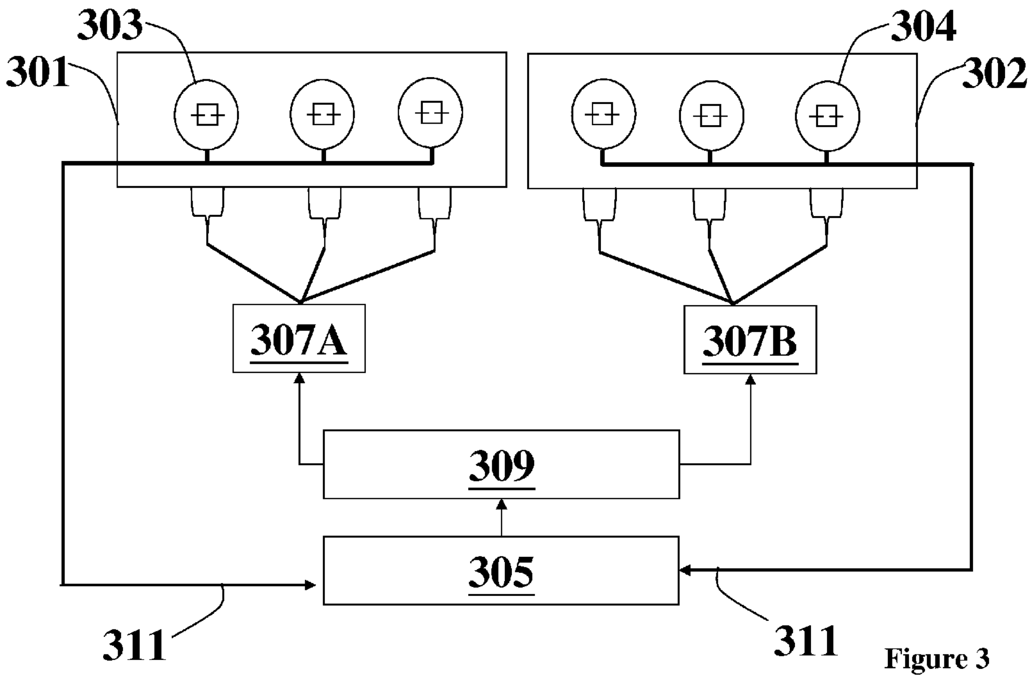
FIG. 3 illustrates a view of an integrated photonic device having multiple LED assemblies according to various aspects of the present disclosure.

FIG. 3 illustrates a view of an integrated photonic device having multiple LED assemblies according to various embodiments of the present disclosure. As shown, LED assembly 301 has three LEDs including LED 303, and LED assembly 302 has three LEDs including LED 304. Light output of each LED in the assemblies is detected at detector 305 via light transmission lines 311. A device to convert an analog detection signal to a digital signal may be a part of the detector or in between the detector and controller as a separate component. The light output information is sent to controller 309, which controls drivers 307A and 307B that sends a current to each LED.

In some embodiments, the assemblies 301 and 302 are individual image pixels having separate RGB LEDs. The pixels can generate the same light or different light based on the controller's instructions to the drivers 307A and 307B. In other embodiments, the assemblies 301 and 302 are light bar modules in a backlight unit, for example, for an LCD television. For an LCD television, light output uniformity in the backlight unit is highly desirable. Thus, controller 309 would compare the total output of the light bars 301 and 302 and instruct the drivers to make them equal. The controller 309 may also ensure that light intensities of individual LEDs are the same. Although FIG. 3 shows drivers 307A and 307B connected to the LEDs in parallel, drivers for LEDs connected in series is also envisioned where the total light output of an assembly is controlled to be the same as another assembly. The LED assemblies are not limited to groups of 3 LEDs; any number of LEDs in a group driven together may be used.

Figure 4:
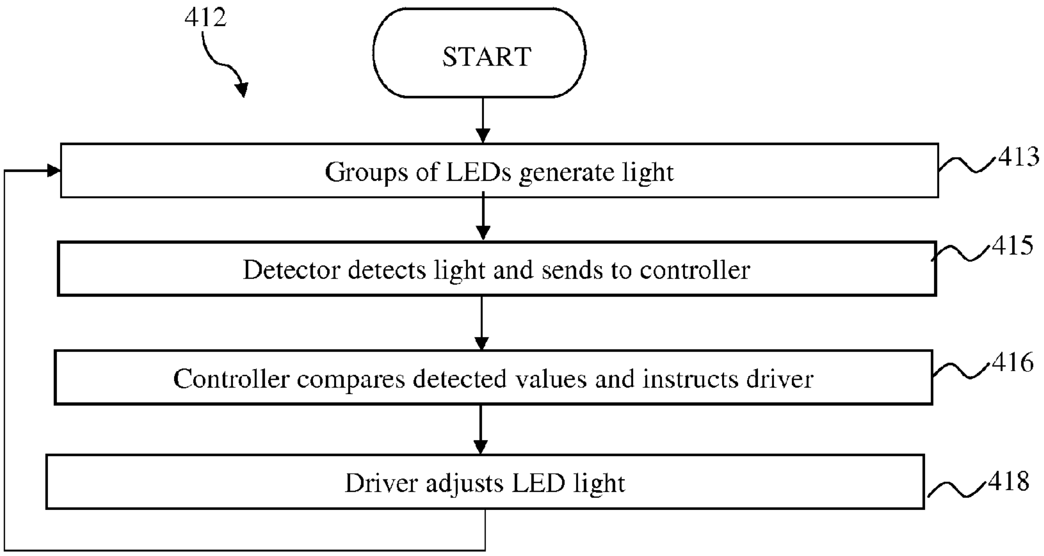
FIG. 4 is a flowchart illustrating a method of using an integrated photonic device according to certain embodiments of the present disclosure.

FIG. 4 is a flow chart showing one method 412 of using the device of FIG. 3. In operation 413, groups of LEDs generate light. The detector detects the generated light and sends the information to the controller in operation 415. In operation 416, the controller compares the detected values with each other or with some specified value and instructs the driver to change the current. In operation 418, the driver drives the LEDs and adjusts the LED light output by changing the current, if necessary.

As disclosed above, the comparison may be performed after some computation, for example, summing of the light output for all LEDs in a light bar assembly. Additionally or alternatively, further computations may be performed after the comparison. For example, the difference between the measured value and expected value may be calculated and a current adjustment for the difference found on a calibration curve or a look up table.

Various embodiments of the present disclosure pertain to a display having many light bars as back lighting. Backlit displays include LCD television and monitors and certain commercial displays. Each light bar includes a number of LEDs, a driver coupled to each LED and having a current generator, and an optical transmission line to transmit a portion of light generated by each LED. The light portions are transmitted to a detector that includes a photo sensor disposed to receive light through the optical transmission line. The display also includes a controller coupled to the light detector and the driver. The controller may include memory and logic configured to adjust LED light intensity or color depending on the detected values.

As discussed, LED output depends on current driven and the voltage drop across the LED. The LEDs in the figures are shown connected to the driver in parallel so that the current flowed through each LED is separately controlled by the driver; however, the present disclosure is not so limited. In other embodiments, the LEDs are connected to the driver in series so that the current flown through each LED are the same. Individual LED control may be achieved by changing a voltage drop across each LED. One such method involves changing a resistance, i.e., of a potentiometer, across each LED separately. In other words, other methods to achieve individual LED control are available and the present disclosure is not limited to current adjustment only modes.

Figure 5:
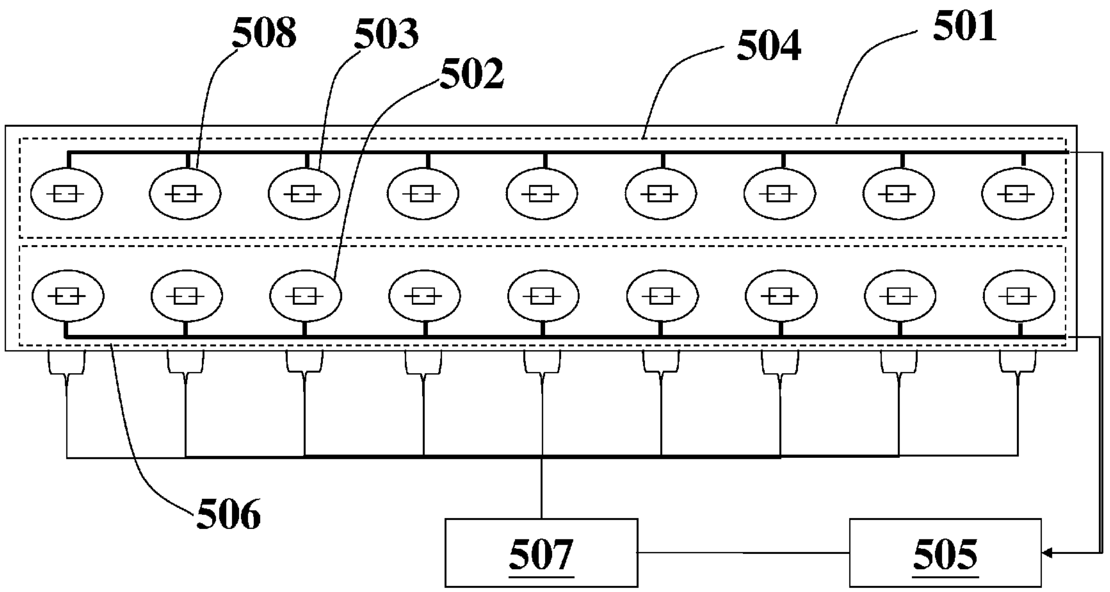
FIG. 5 illustrates a view of an integrated photonic device having a backup LED bank according to various aspects of the present disclosure.

FIG. 5 illustrates a view of an integrated photonic device having a backup LED bank. The device as shown includes a device board 501 having two LED banks including a first bank 506 and a backup bank 504. Each of the banks of LEDs are connected via one or more light transmitter to detector 505 and then to driver 507. Each of the LEDs in one bank has a corresponding counterpart in the other bank, for example, LEDs 502 and 503 are counterparts, one in each bank. The counterparts are connected by a switch (not shown) or similar mechanism that can redirect the current from the driver.

In this embodiment, the backup bank of LEDs is not used initially in device operation. After some device use, one or more LEDs may start to decay, and at a certain point the LEDs in the backup bank is put into service. In one example, the switch is activated to change the LED in use to the LED in the backup bank. If LED 502 light output starts to decay, at a certain point the LED 503 is put into use instead or in addition to LED 502 so that the total light output stays constant. As pictured, the counterpart LEDs are mounted in pairs so that this transition is relatively transparent to the end user. An example of the point at which the transition occurs is when even at maximum current, the light output of the decayed LED cannot meet a specified output.

In another example, a switch is activated to change the entire LED device to the backup bank. This way, the driver need not adjust the output on a LED-by-LED basis. Using the backup bank allows continued use of the device while the LED in the first bank can be replaced.

In still another example, a LED in the backup bank that is not the counterpart LED may be put into service. If LED 502 goes out completely, in this example, LEDs 503 and 508 may be both put into service to maintain the total light output. One skilled in the art would recognize that many control schemes and possibilities exist using this concept of having additional backup LEDs on a device. This concept is especially suitable for applications where disruptions in light output is highly undesirable or if light output uniformity is very important.

In other aspects, the feedback structure for a LED device may be used to warn an operator in a safety application. Increasingly, LEDs are used for lighting and warning applications outside of vehicles, such as cars, airplanes, and trains. The method may include measuring a light intensity of a number of LEDs mounted on an exterior of a vehicle, comparing the measured light intensities to a specified baseline, and warning an operator if the measured light intensities are below a specified baseline. LED decays may occur slowly over time and go unnoticed; however, the reduced light output may reduce visibility and cause safety issues without triggering an alarm or warning. Measuring the light intensity periodically and comparing the measured value against a specified baseline allows a timely warning to be issued to an operator. The warning can take many forms, including a sound, or a light.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated photonic device comprising:

a plurality of light emitting diodes (LEDs);

an optical transmission line coupled to the LEDs;

a light detector coupled to the optical transmission line and configured to detect a light output data individually from each of the LEDs through the optical transmission line;

a controller coupled to the light detector, wherein the controller contains a memory and a logic processor, the memory storing an algorithm and a predetermined light output value, the logic processors executing the algorithm based on the detected light output data, the predetermined light output value, and a user inputted value to perform the following steps: receiving, from the light detector, the detected light output data individually for each LED; and comparing, for each LED, the detected light output data with one of: an initial light output data of said LED, a light output data of said LED from a previous detection, the predetermined light output value, and the user inputted value; and a driver coupled to the controller, wherein the driver is configured to adjust, based on a comparison result from the controller, a current for each LED such that neighboring LEDs have uniform light outputs.

2. The device of claim 1, wherein the light detector comprises a photo sensor, the photo sensor being a charge-coupled device or a Complementary Metal-Oxide-Semiconductor (CMOS) sensor.

3. The device of claim 1, wherein the optical transmission line is an optical fiber or a light pipe.

4. The device of claim 1, wherein the optical transmission line includes multiple branches ending at separate LEDs.

5. The device of claim 1, wherein the light detector further comprises optical transmission lines such that light received from each of the LEDs are transmitted separately.

6. The device of claim 1, wherein the light output data from the light detector comprises light intensity, light color, or both.

7. The device of claim 1, wherein the controller is configured to increase current for a LED when low light output is detected.

8. The device of claim 1, wherein the logic processor of the controller is configured to match light output of adjacent LEDs by adjusting a LED current.

9. The device of claim 1, wherein the logic processor of the controller is configured to match light output of groups of LEDs by adjusting current for a number of LEDs in a group.

10. An integrated photonic device comprising:

a light emitting device having a red LED, a blue LED, and a green LED;

a driver coupled to each LED;

an optical transmission line coupled to the light emitting device and configured to transmit a portion of light generated by each LED;

a light detector coupled to the optical transmission line and configured to individually detect light output values from the red LED, the blue LED, and the green LED through the optical transmission line; and a controller coupled to the light detector and the drivers, said controller comprising a logic processor and a memory, wherein the memory stores an algorithm and a predefined targets for the red LED, the blue LED, and the green LED, and wherein the logic processor executes the algorithm based on the detected light output values, the predefined targets, and a user inputted value to individually adjust a driving current for each of the red LED, the blue LED, and the green LED, so that light outputs from the red LED, the blue LED, and the green LED each achieve the respective predefined targets or the user inputted value, and wherein the predefined targets for each LED includes one of: an initial light output data of said LED or a light output data of said LED from a previous detection.

11. The device of claim 10, wherein the light detector comprises a photo sensor, the photo sensor is a charge-coupled device or a Complementary metal-oxide-semiconductor (CMOS) sensor, and wherein the photo sensor detects LED light intensity and color.

12. The device of claim 10, wherein the optical transmission line is multiplexed to each LED.

13. The device of claim 10, wherein the predefined targets for the red LED, the blue LED, and the green LED are different from one another.

14. The device of claim 10, wherein the logic processor of the controller is configured to execute the algorithm so as to maintain a white color intensity and a color temperature.

15. A display comprising:

a light bar comprising a first LED bank including a group of first LEDs and a backup LED bank including a group of second LEDs that are counterparts of the first LEDs, wherein one or more of the second LEDs in the backup LED bank are individually activated to replace their counterparts in the first LED bank, a driver coupled to each of the groups of first and second LEDs, and an optical transmission line disposed to transmit a portion of light generated by each LED; and a light detector coupled to the optical transmission line and configured to individually detect a light output data from each of the first LEDs in the first LED bank through the optical transmission line; and a controller coupled to the light detector and the driver, said controller comprising a logic processor and a memory, the memory storing an algorithm and a predefined light output value, wherein the logic processor executes the algorithm based on the detected light output data, the predefined light output value, and a user inputted value to adjust LED light intensity or light color.

16. A method comprising:

measuring a light intensity of a plurality of LEDs, wherein the light intensity of each LED is measured individually;

storing a predefined light output value in an electronic memory;

receiving a user-defined light output value from a user input device;

comparing the measured light intensity from each of the plurality of LEDs, wherein the comparing comprises individually comparing, for each LED, the measured light intensity with one of: an initial light intensity of said LED, a light intensity for said LED from a previous measurement, the predefined light output value, or the user-defined light output value;

adjusting, in response to the comparing, a current for each LED in at least a subset of the plurality of LEDs such that the light intensity from neighboring LEDs become uniform with one another.

17. The method of claim 16, wherein the current for a selected subset of the plurality of LEDs that have lower light intensity than a remainder of the plurality of LEDs is increased.

18. The method of claim 16, wherein the current for a selected subset of the plurality of LEDs that have higher light intensity than a remainder of the plurality of LEDs is decreased.

19. The method of claim 16, wherein the plurality of LEDs are from a first LED bank, and further comprising: activating one or more LEDs from a backup LED bank to replace their counterpart LEDs in the first LED bank.

20. The method of claim 16, wherein the current for the subset of the plurality of LEDs is adjusted such that a sum of the light intensity for the subset of the plurality of LEDs is substantially equal to a sum of the light intensity for a remainder of the plurality of LEDs.

* * * * *